US005675781A

United States Patent [19]

Duncan et al.

[11] Patent Number: 5,675,781
[45] Date of Patent: Oct. 7, 1997

[54] AUGMENTING VOLUME MANAGEMENT OF INFORMATION STORAGE DEVICES TO HANDLE DIRECT ACCESS TO STORAGE DEVICES

[75] Inventors: William L. Duncan; Howard Alt, both of Colorado Springs, Colo.

[73] Assignee: Sun Microsystems, Inc., Mountain View, Calif.

[21] Appl. No.: 498,996

[22] Filed: Jul. 6, 1995

[51] Int. Cl.$^6$ .................................................. G06F 13/36
[52] U.S. Cl. .......................... 395/608; 395/479; 395/680
[58] Field of Search .............................. 395/439, 474, 395/479, 490, 477, 478, 485, 600, 650, 700, 848, 726, 727, 728, 730, 858, 608, 680

[56] References Cited

U.S. PATENT DOCUMENTS

| 4,819,159 | 4/1989 | Shipley et al. ............... 395/182.17 |
| 5,430,845 | 7/1995 | Rimmer et al. ............... 395/275 |
| 5,502,839 | 3/1996 | Kolnick ............... 395/800 |
| 5,535,416 | 7/1996 | Feeney et al. ............... 395/834 |
| 5,537,592 | 7/1996 | King et al. ............... 395/600 |

FOREIGN PATENT DOCUMENTS

| 0 482 853 A3 | 4/1993 | European Pat. Off. . |
| WO 91/19246 | 12/1991 | WIPO . |

OTHER PUBLICATIONS

"Poll and Select Function for Cascaded Device Drivers on a Unix Operating System," IBM Technical Disclosure Bulletin, vol. 34, No 10A, Mar. 1992, pp. 124–125.

*Primary Examiner*—Eddie P. Chan
*Assistant Examiner*—Hiep T. Nguyen
*Attorney, Agent, or Firm*—William J. Kubida; Homer L. Knearl; Holland & Hart LLP

[57] ABSTRACT

A computing system operates a volume management system to manage accesses to the storage of information and provides to the users of the volume management system parallel process paths for accessing a storage device is as an access volume operation or as an access device operation. Further the volume management system prevents the two parallel logical operations from conflicting with each other by performing an open volume operation and an open device operation. These operations indirectly communicate by setting and clearing characteristics in stored volume data characteristics that they share for each device being accessed. The characteristics include an open count to track the open status of a device and an exclusive flag to track whether the storage device has been opened exclusively by either the open volume or the open device operation request from a user.

16 Claims, 8 Drawing Sheets

AUGMENTING VOLUME MANAGEMENT OF INFORMATION STORAGE DEVICES TO HANDLE DIRECT ACCESS TO STORAGE DEVICES

BACKGROUND OF THE INVENTION

1. Field of the Invention

This invention relates to a volume management system wherein the system using the volume management driver may also access a storage device directly without conflicting with the volume management system.

More particularly, the invention relates to augmenting the volume management driver in a UNIX operating system to add a capability to operate in a manner that allows the user to issue direct commands to a device through the volume management system drivers.

2. Description of Related Art

In a UNIX operating system there exist volume management systems for devices particularly disk drive devices for managing the storage of information on optical or magnetic disk in a storage system. The volume management software is part of the kernel in the UNIX operating system. The objective of this volume management software is to manage the storage media as opposed to management of the storage device. For example, the volume management software would access storage media by name such as the volume name for a floppy disk in a diskette drive or for cylinders in a hard disk drive. Before volume management was available, a device driver in the UNIX kernel provided direct access to a device by the device name as for example, the A disk drive or the C disk drive.

Figure 1:
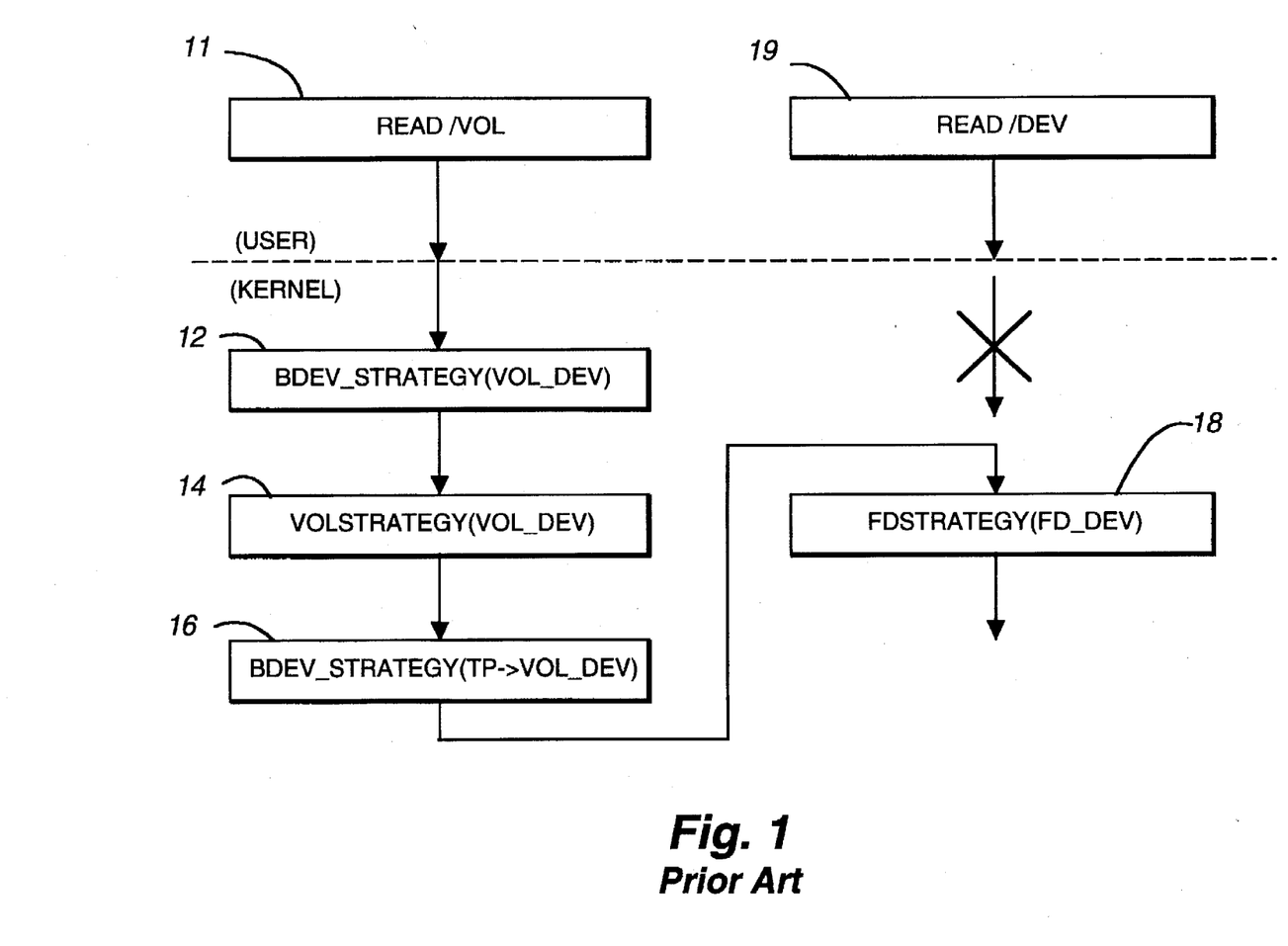
FIG. 1 is a flow diagram of the layered volume management system as it exists in the prior art.

The present design of volume management system drivers is referred to as layered. As an example of operating in a layered volume management system, FIG. 1 shows a read volume operation. Operation 11 from the application program (user) to the operating system kernel is "read/vol," i.e. a request to read data from a location identified as a storage media volume. The process flows from the read request operation 11 from the user to the kernel of the UNIX operating system where a device driver at a first layer in the volume management system is the block device module "bdev_strategy(vol_dev)" 12. Device driver 12 at this first layer interprets the read operation for the volume and identifies the type (storage, printer, display, etc.) of device as specified by the "(vol_dev)" parameters. The volume parameters in this case identify a storage type of device. This first driver routine 12 calls module 14, "volstrategy(vol_dev)," at the next layer. Routine 12 knows that for vol_dev parameters received, it needs to call volstrategy(vol_dev). Module 14 further interprets vol_dev parameters received from module 12 and identifies the storage device or storage system where the volume is located. The volstrategy module 14 then drives routine 16 back up at the device driver layer 12. Module 14 identifies the vol_dev number received as actual device number "tp->vol_dev," so it passes that to the block device driver routine 16, "bdev_strategy(tp->vol_dev)." Routine 16 identifies a type of storage device, a hard disk drive, a floppy disk drive or yet another storage system. In this example the device is a floppy disk drive or diskette drive. Routine 16 calls module 18 which is the floppy disk device driver for the diskette drive where the volume is located. Module 18 is the lowest layered level, and in this example module 18 is "fdstrategy(fd_dev)," a floppy disk driver routine.

In this layered volume management system the device that is ultimately opened and contains the volume being accessed is exclusively opened by the volume management system. Therefore, it is not possible for a direct access read operation such as "read/device" operation 19 from the user to gain access to a device already accessed by the volume management system. This is indicated in FIG. 1 by the blocked path between operation 19 and module 18.

In the past users were not able to get direct access to a device, and were only able to access it through the volume management system, but first they had to go through a volume check command and then recite a path from the volume down to the device where the information in the volume to be accessed was located. This level of complexity for the user to be able to access a device has prompted many users just to turn off volume management and use only device direct access commands. What is needed is the ability to have the UNIX operating system interpret both a volume management access command from the user and a direct device access command from the user without conflict.

Direct access to a device through multiple layers of drivers is typically referred to in the art as stacked device drivers. In stacked device drivers the intermediate drivers are transparent. Accordingly, the read command from the user may proceed down the device driver layer and into the storage device driver layer without any volume path specification by the user. What is needed by the user might be referred to as a volume management system that is both layered and stacked.

SUMMARY OF THE INVENTION

It is an object of this invention to provide a layered and stacked volume management system.

In accordance with this invention, the above object is accomplished by a computing system operating a volume management system for the storage of information and providing to the users of the volume management system parallel process paths for accessing a storage device as an access volume operation or as an access device operation. Further the volume management system prevents the two parallel logical operations from conflicting with each other by performing open volume operation and open device operation that indirectly communicate by setting and clearing volume data. The volume data is meta-data that describes characteristics of the volume being accessed and the device being accessed. The meta-data includes an open count and an exclusive flag to track the open status of a device. Open count indicates if the device is open, and the exclusive flag indicates whether the storage device has been opened exclusively by either the open volume or the open device operation request from a user.

The inventive process includes computer implemented steps of accessing a storage device through parallel processes—access volume process and access device process. The access volume process and the access device process both detect whether the requested storage device is already open and whether or not its opened exclusively. This detection is accomplished by testing for an exclusive flag in the volume data for the device the user requested access to. Next the access volume process and the access device process test whether the request is an exclusive open request. These tests allow the parallel processes to maintain an open count and an exclusive flag for each storage device. By monitoring the open count for non-zero and the exclusive flag, each process can return a busy code when the requested device is already exclusively open or the request is for an exclusive open, and the device has already been opened by a previous request that is still pending, i.e. has not been closed.

The great advantage of this invention is that it permits a user to access storage devices either through an access volume operation or an access device operation. To the user either process is equally available and thus the user can operate both processes in parallel without concern for disabling or inhibiting the volume management system.

The foregoing and other objects, features and advantages of the invention will be apparent from the following more particular description of a preferred embodiment of the invention as illustrated in the accompany drawings.

DETAILED DESCRIPTION OF PREFERRED EMBODIMENTS

The volume management system operations involve four primary operations—open, read, write, and close. Each of these operations follow the parallel flow through layers of driver modules. In one process path, the layers are access volume process defined. In the other process path, the layers are access device process defined. The parallel process paths for read and write operations are independent process flows. However, the parallel process paths for the open operation and the close operation must interact to deal with accesses that require exclusive use of the device.

Figure 2:
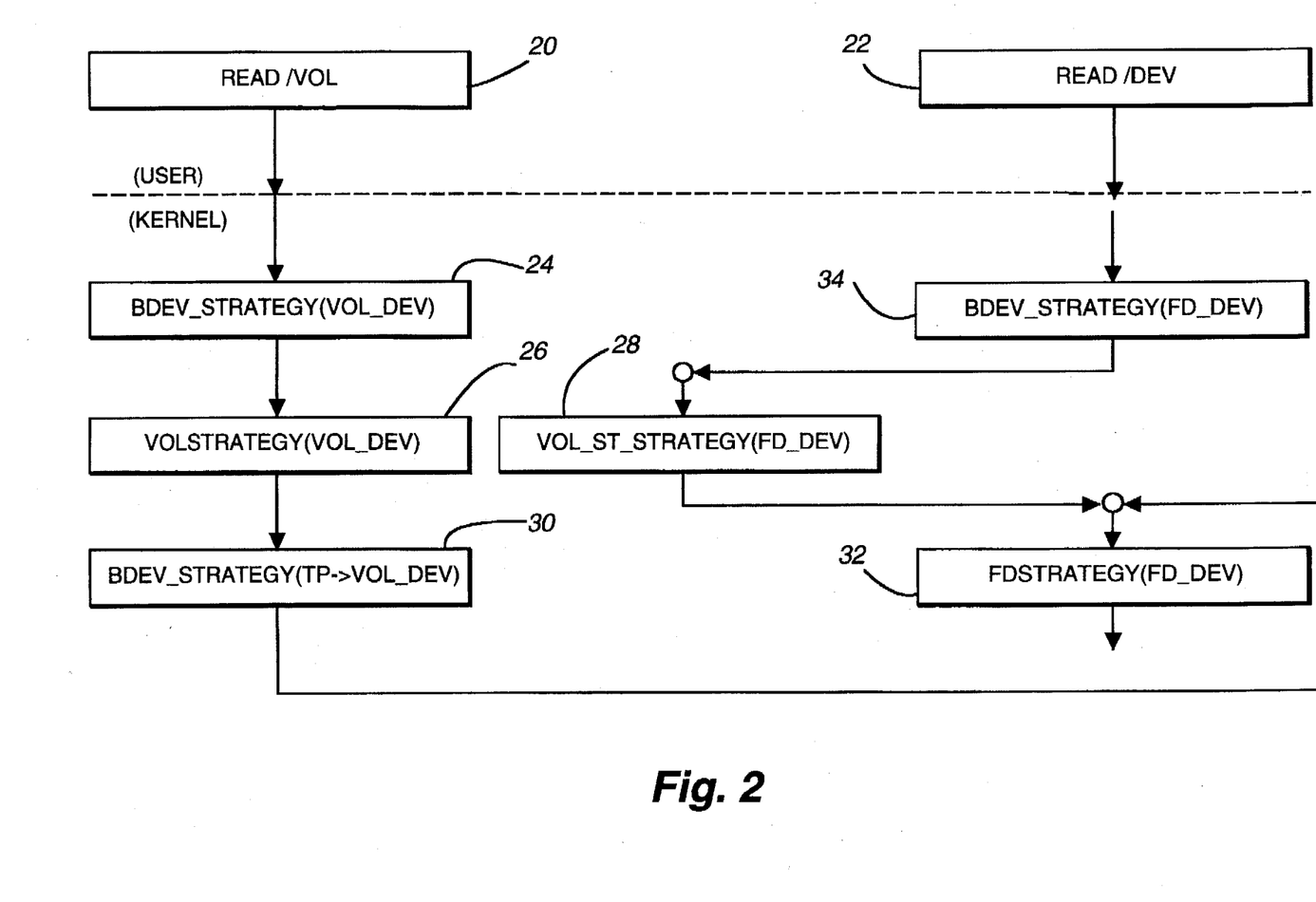
FIG. 2 is a flow diagram of a preferred embodiment of the invention, implementing both the layered and stacked volume management system to perform a read operation.

As shown in FIG. 2, a preferred embodiment of the layered and stacked volume management system for the read operation is initiated by the user through either a read from volume operation 20 or a read from device operation 22. The read from volume operation 20 request is passed to the device driver "bdev_strategy(vol_dev)" module 24. In turn, the block device strategy module 24 calls a volume strategy module 26 based on the type of device identified in the vol_dev parameters.

The volume strategy driver 26 calls a device driver 30 based on the device identified by the vol_dev. Block device strategy module 30 then calls the actual device strategy driver, which in this case is a floppy disk device driver module 32.

In the process flow for the read from device operation 22 from the user, operation 22 calls the block device strategy module 34 for a floppy disk device. This driver module 34 then drives a volume strategy driver module 28 which calls the floppy disk strategy device driver module 32. In this way, the layered process 24, 26, 30 and stacked process 34, 28 for the volume management system operate in parallel. The write operation flow is identical to the read operation flow.

Figure 3:
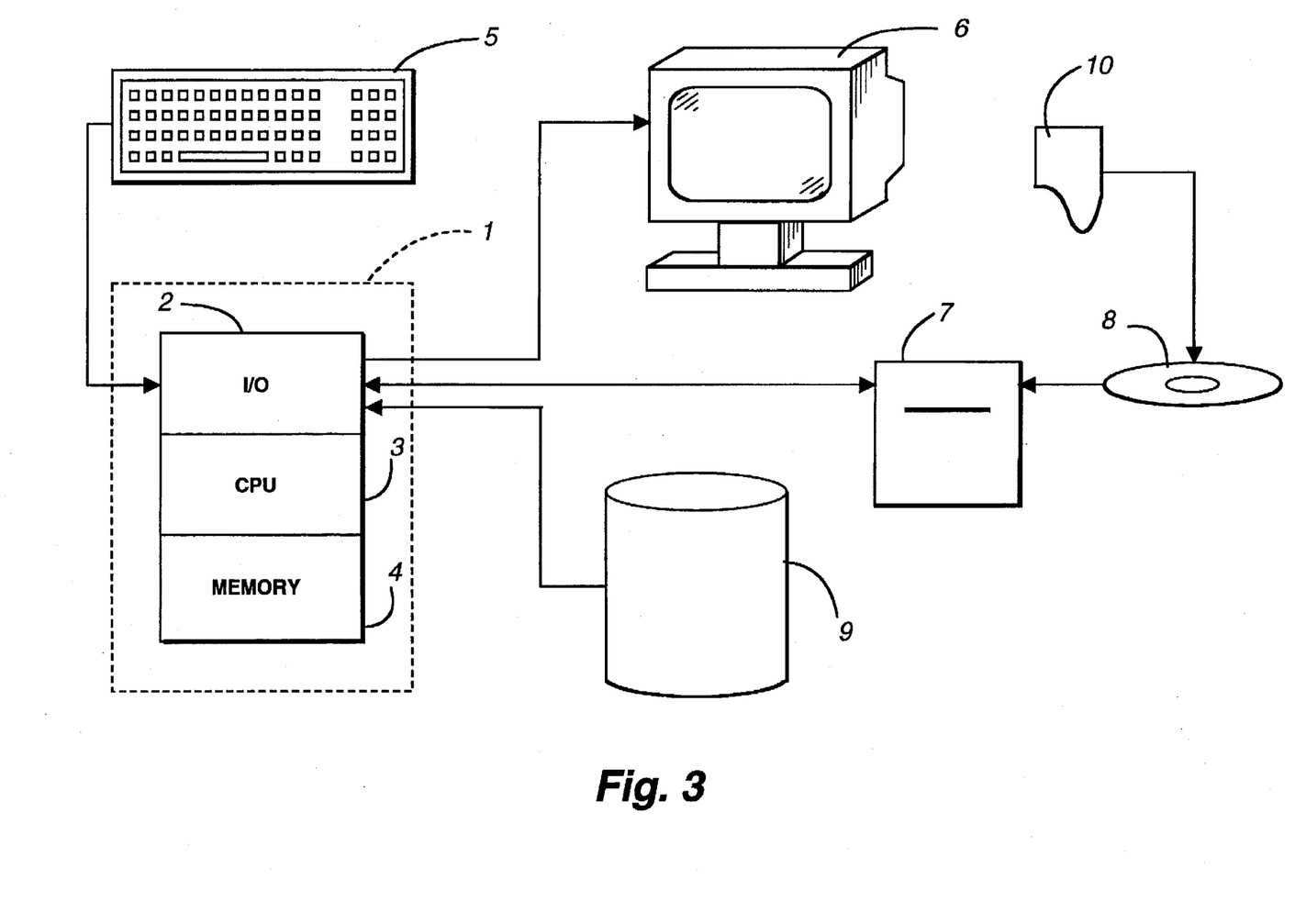
FIG. 3 illustrates a computing system to perform the computer implemented steps in accordance with the invention.

The operating environment in which the present invention is used encompasses the general distributed computing system, wherein general purpose computers, workstations, or personal computers are connected via communication links of various types, in a client-server arrangement, wherein programs and data, many in the form of objects, are made available by various members of the system. Some of the elements of a general purpose workstation computer are shown in FIG. 3, wherein a processor 1 is shown, having an input/output (I/O) section 2, a central processing unit (CPU) 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains programs 10 and data. The computer program products containing mechanisms to effectuate the apparatus and methods of the present invention may reside in the memory section 4, or on a disk storage unit 9, or on the CD-ROM 8 of such a system. Examples of such systems include SPARC systems offered by Sun MicroSystems, Inc., personal computers offered by IBM Corporation and by other manufacturers of IBM-compatible personal computers, and systems running the UNIX operating system.

Figure 4:
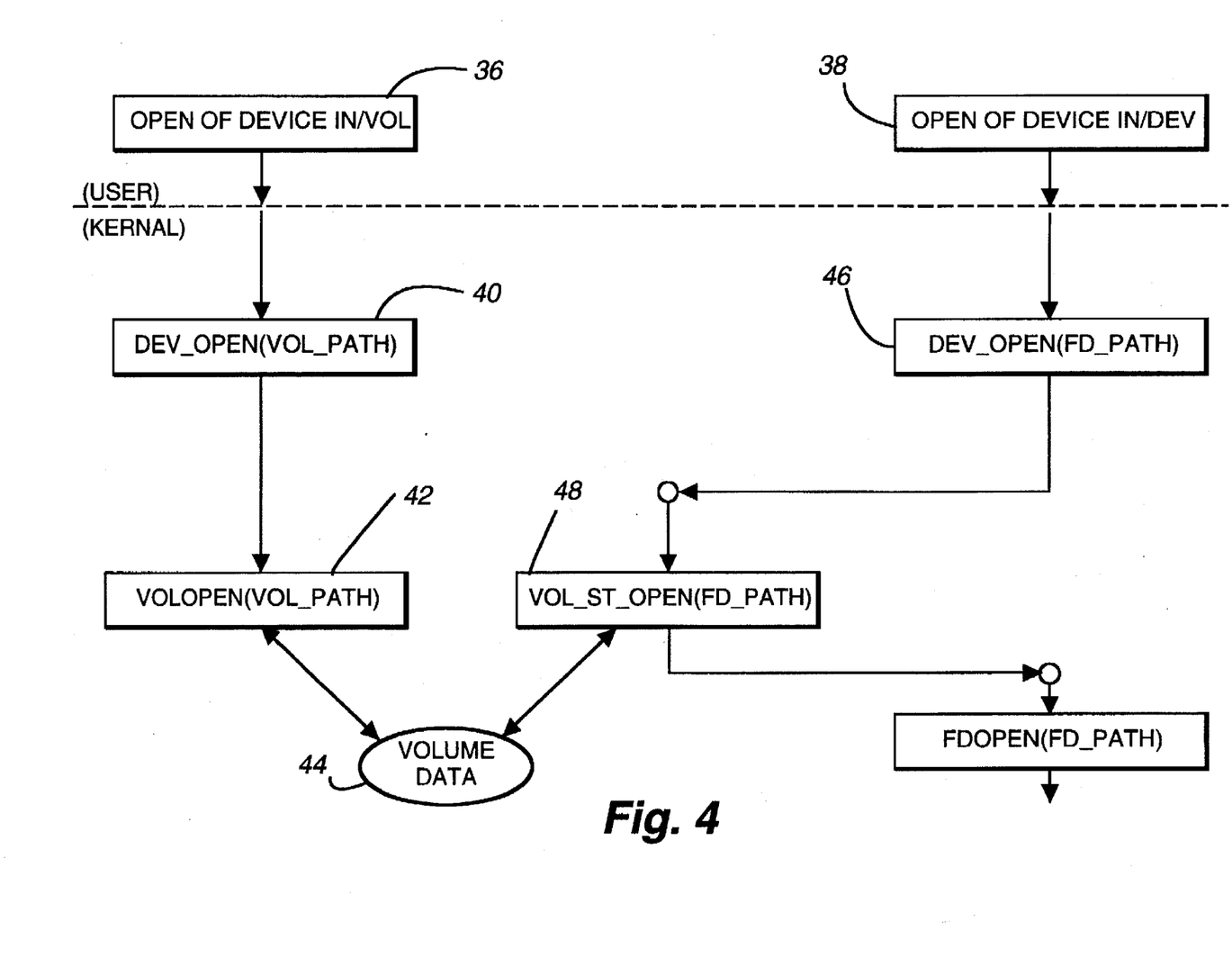
FIG. 4 shows a preferred embodiment for the open volume and open device processes and logical operations of the invention.

Before an access (read or write) operation may be performed as described above with reference to FIG. 2 possible conflicts in access to the same storage device by either the read from volume operation 20 or the read from device operation 22 must be resolved by an open operation. The open operation as shown in FIG. 4 begins with either a user open volume request operation 36 of "open of device in /vol" or a user open device request operation 38 of "open of device in /dev." The volume open operation calls the "dev_open(vol_path)" driver module 40. Dev_open Module 40 determines the device to be opened from the vol_path parameters and calls the "volopen(vol_path)" driver module 42. Volopen module 42 tests for exclusive open status and tests for an exclusive open request received from the user's open volume operation 36. Volopen module 42 operates on the volume data 44 assigned to the device requested by the open request. Volopen module determines from the volume data if there are conflicts in open requests from open volume operation 36 and from open device operation 38.

In FIG. 4 the open requests from open device operation 38 pass through "dev_open(fd_path)" driver module 46 to "vol_st_open(fd_path)" driver module 48. Dev_open Module 46 determines the device to be opened from the fd_path parameters and calls the "vol_st_open(fd_path)" driver module 48. vol_st_open module 48 just like volopen module 42 operates on the volume data 44 to resolve conflicts in open requests from open volume operation 36 and from open device operation 38.

Figure 5:
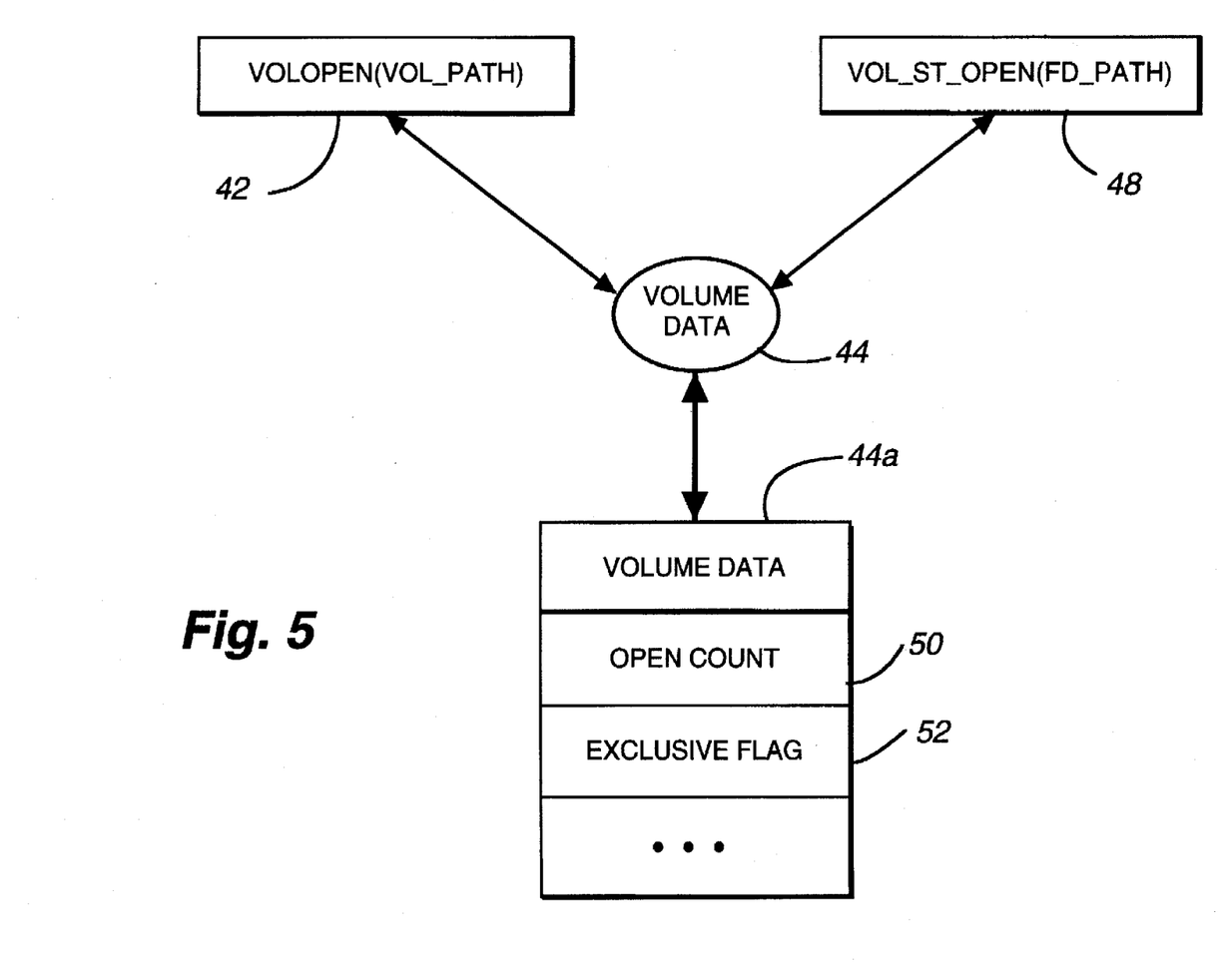
FIG. 5 shows the structure of the volume data indicating the open count and exclusive flag in the meta data making up the volume data.
Figure 6:
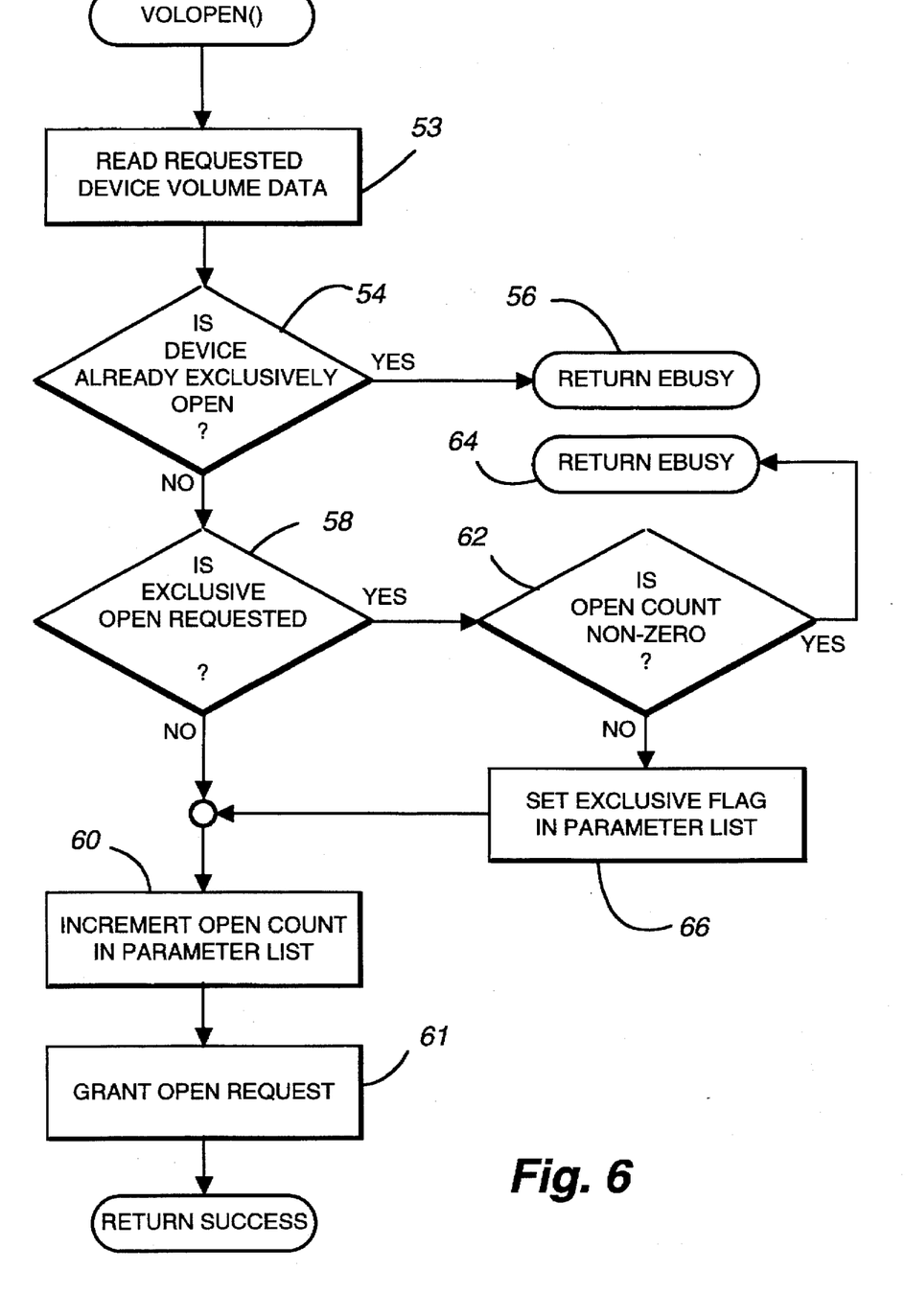
FIG. 6 shows the detailed operation flow of the volume open process in FIG. 4.
Figure 7:
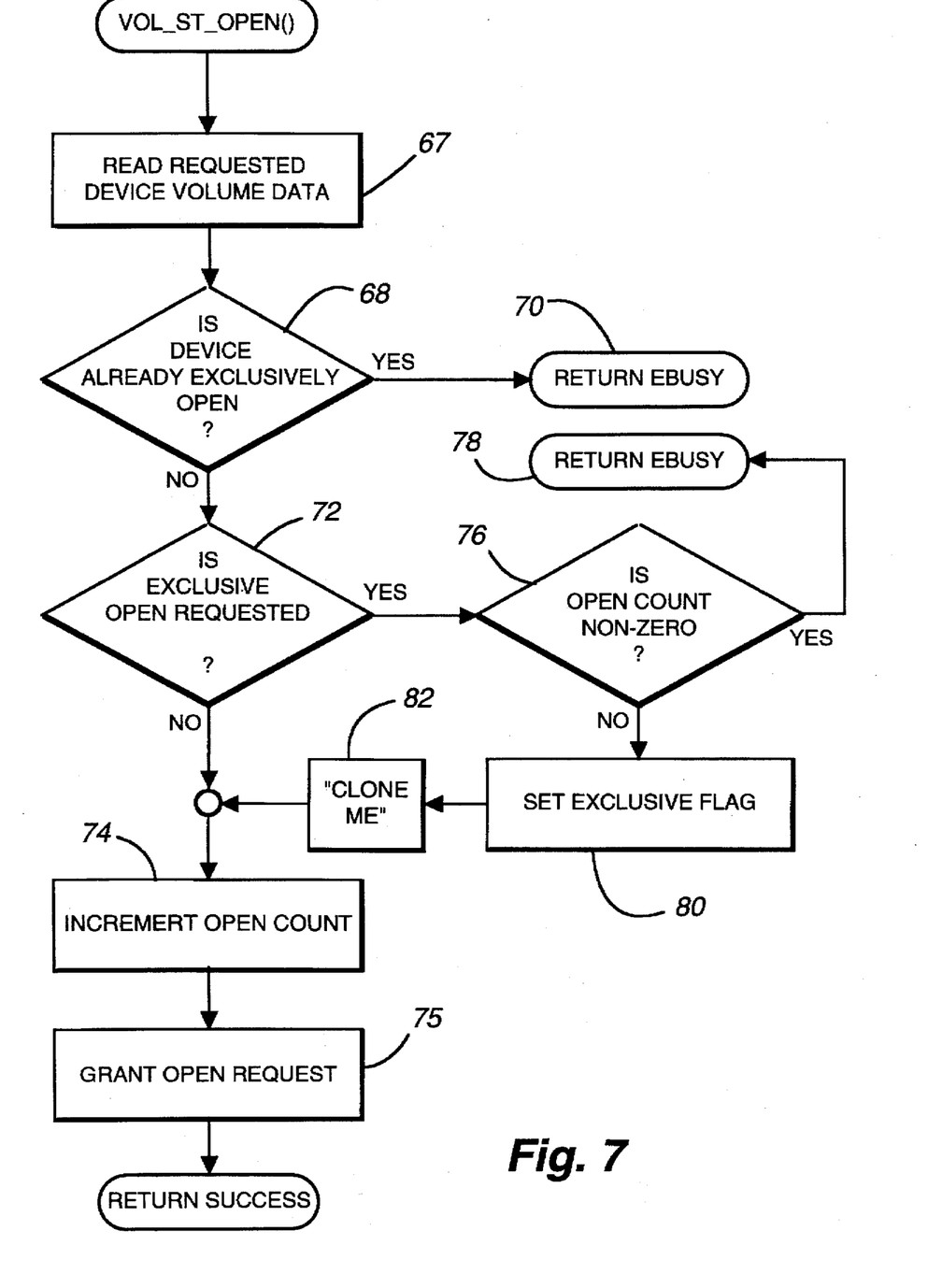
FIG. 7 shows the detailed operation flow of the device open process in FIG. 4.

The structure of the volume data 44 is illustrated in FIG. 5 and the operation flow of volopen module 42 and vol_st_open module 48 are shown in FIGS. 6 and 7, respectively. In FIG. 5, the volume data 44 structure is shown expanded as storage areas 44a. The volume data comprises meta data that describes characteristics of the volume and device where the volume is located. The characteristics of interest to the preferred embodiment of the invention are open count 50 and exclusive flag 52. These characteristics are used by volopen module 42 and vol_st_open module 48 to resolve conflicts in access to a device.

In FIG. 6, the volopen process and logic operations for resolving conflicts are shown. When the volopen module is called, operation 53 reads the volume data characteristics from the volume meta-data for the requested device. Decision operation 54 first tests the volume data 44 for an exclusive flag for the device. If there is an exclusive flag, the process branches to operation 56, and operation 56 returns an EBUSY code to the volume management system. The volume management would then process the next user operation request. If there is no exclusive flag set for the requested device, the process branches to decision operation 58.

Decision operation 58 detects whether the volume open request from the user is an exclusive open request. If the open request is not exclusive, the process branches to increment operation 60 to increase the open count in the volume data by one. Operation 61 grants the open request, and a return success code goes to the operating system.

If the open request is exclusive, the processes branches YES from decision operation 58 to decision operation 62. Operation 62 tests whether the open count in the volume data characteristics is non-zero. If there is any count in the open count characteristic, operation 64 returns an EBUSY code to the volume management system. In this situation, the device is already open, so an exclusive open is not possible at this time. If the open count is zero, the process branches NO from decision operation 62 to set operation 66. Operation 66 sets the exclusive flag in the volume data for the requested device. Operation 60 then increments the open count characteristic, operation 61 grants the open request, and the volopen module operation for volume access process is complete.

If the user request was an open device request, the process or logical operations are performed by vol__st__open module as shown in FIG. 7. When the vol__st__open module is called, operation 67 reads the volume data characteristics for the volume data assigned to the requested device. Decision operation 68 detects whether the volume data 44 contains an exclusive flag for the device. If there is an exclusive flag, the process branches YES to return operation 70. Operation 70 returns an EBUSY code to the volume management system. If there is no exclusive flag set for the requested device, the process branches to decision operation 72.

Decision operation 72 tests if the device open request from the user is an exclusive open request. If the open request is not exclusive, the process branches to increment operation 74 to increase the open count in the volume data by one. Operation 75 grants the open request, and a success code is returned to the operating system.

If the open request is exclusive, decision operation 72 branches the process to decision operation 76. Operation 76 detects whether the open count in the volume data characteristics is non-zero. If there is a count in the open count characteristic for the device in the volume data, the process branches to operation 78 which returns an EBUSY code to the volume management system. If the open count is zero, the process branches NO from decision operation 76 to set exclusive flag operation 80. Operation 80 sets the exclusive flag for the requested device in the volume data, and the process flows to "clone me" operation 82.

Clone me operation 82 changes the identification of the device to the host using system. This causes the using system to set another open count characteristic for the device even though the device being accessed is unchanged. The purpose of this cloning operation which sets a new open count characteristic is to create the appearance of a new device open count for each open device request from the user. In the UNIX operating system, open device operations from the using system are sent for each open request. However if there are multiple accesses to the same device, the operating system only sends a close request once at the end of all the open operations, i.e. at the conclusion of the last access operation. Accordingly the volume management system when dealing with open device operations must have a mechanism to balance open requests and close requests. This is accomplished by the cloning operation 82 which creates a pseudo device identity and thus volume data for each open device request so that the operating system will send a close device request for each open device request when each access is completed. After the cloning operation 82, operation 74 increments the new open count characteristic for the pseudo device to one, and the vol__st__open operation is complete.

When the read or write access is completed for the requested volume or device, close operations are sent by the user to the kernel of the UNIX operating system. The close operation is the same as the open operation as illustrated in FIG. 4 except the drive modules are close modules. Also, the volclose(vol__path) operation and vol__st__close(fd__path) are much simpler than volopen(vol__path) operation and the vol__st__open(fd__path) operation.

Figure 8:
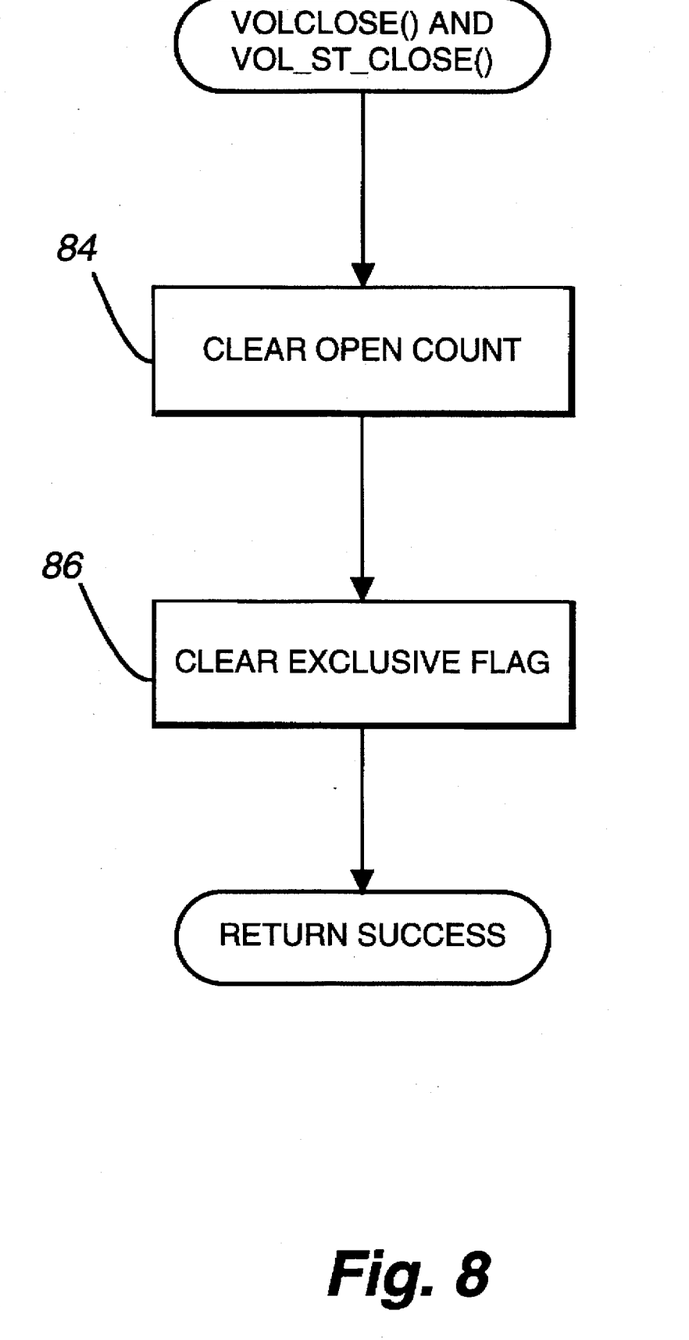
FIG. 8 shows a preferred embodiment of the volume close and device close processes in accordance with the invention.

As illustrated in FIG. 8, the volclose operation and vol__st__close operation are identical. These processes only have to reset the open count characteristic and the exclusive flag characteristic of the volume data for the requested device. When either volclose or vol__st__close are called, the process clears the open count in operation 84 and clears the exclusive flag in operation 86. The volume management system is now ready to process further access requests to the device from user either by the volume access process or the device access process.

While the invention has been particularly shown and described with reference to a preferred embodiment thereof, it will be understood by those skilled in the art that various other changes in the form and details may be made therein without departing from the spirit and scope of the invention.

What is claimed is:

1. In a computing system, apparatus for managing the access to storage devices by user requests to the computing system, said apparatus comprising:

volume data for each storage device stored in the computing system;

an open volume operative system and an open device operative system, said operative systems are operated in parallel and exchanging open status information for a storage device requested by a user application through the volume data for the requested storage device;

said open volume operative system responsive to the volume data for testing whether the requested device is already open exclusively and whether an open volume request from the user application is an exclusive open request;

said open device operative system responsive to the volume data for testing whether the requested device is already open exclusively and whether an open device request from the user application is an exclusive open request;

said open volume operative system and said open device operative system return an open successful to permit read or write access to the device by the computing system when each operative system detects that the requested device is not already exclusively open or if the request is an exclusive open request that the device is not already open, otherwise return a busy code.

2. The apparatus of claim 1 and in addition:

said open volume operative system and said open device operative system return a busy code to the operating system when the requested storage device is already exclusively open or when the requested storage device is already open and the request is for an exclusive open of the storage device.

3. The apparatus of claim 2 wherein said volume data includes an open indicator and an exclusive open indicator for each storage device.

4. The apparatus of claim 3 wherein the open indicator is an open count incremented for each open request and wherein:

said open volume operative system and said open device operative system test for a non-zero count to determine whether the requested storage device is already open.

5. Apparatus for managing volume access requests and device access requests to information storage devices, said apparatus comprising:

a volume data storage element for storing characteristics of each storage device as volume data for each storage device, said volume data including characteristics indicating the open status of the storage device;

a volume access processor responsive to a request to access a volume in a first storage device, said volume access processor for testing characteristics from volume data for the first storage device to determine the open status of the first storage device;

said volume access processor processing the volume access request, granting the request based on the open status and updating the characteristics in the volume data so that said characteristics indicate the updated open status of the first storage device;

a device access processor responsive to a request to access the first storage device, said device access processor testing characteristics from the volume data for the first storage device to determine the open status of the first storage device;

said device access processor processing the device access request, granting the request based on the open status and updating the characteristics in the volume data so that said characteristics indicate the updated open status of the first storage device, whereby said volume access processor and said device access processor are operated in parallel and each access the first storage device and manage conflicts for exclusive access.

6. The apparatus of claim 5 wherein the characteristics in the volume data for each storage device include an open count indicating whether the storage device is open and an exclusive flag indicating whether the storage device is exclusively open.

7. The apparatus of claim 6 wherein:

each of said volume access processor and said device access processor detecting the exclusive flag for the requested storage device and returning a busy code to the computing system; and each of said volume access processor and said device access processor detecting a non-zero open count for the requested storage device and a request for exclusive open and returning a busy code to the computing system.

8. The apparatus of claim 6 wherein:

each of said volume access processor and said device access processor detecting a zero open count and a request for an exclusive open and granting the request and setting an exclusive flag in the volume data for the requested storage device.

9. The apparatus of claim 8 wherein:

each of said volume access processor and said device access processor detecting a nonexclusive open request, granting the request and incrementing the open count for the requested storage device.

10. A method for managing storage devices in a computing system comprising the steps of:

Storing a characteristic list for each storage device, the characteristic list including an open count indicating the number of current open requests to each device and including an exclusive flag indicating whether or not the device has been opened exclusively by a request;

in response to an open volume request, detecting, by an open volume operative system, from the exclusive flag in the requested device characteristic list whether the requested device is already exclusively open and detecting from the open volume request whether a request for a storage device is an exclusive open request and testing the open count in the requested device characteristic list to detect if the requested device is already open whereby the availability of the storage device is determined; and in response to an open device request, detecting, by an open device operative system, from the exclusive flag in the requested device characteristic list whether the requested device is already exclusively open, and detecting from the open device request whether a request for a storage device is an exclusive open request and testing the open count in the requested device characteristic list to detect if the requested device is already open whereby the availability of the storage device is determined;

wherein the open volume operative system and the open device operative system are operated in parallel without conflict.

11. The method of claim 10 and in addition the steps of:

returning to the computing system a busy code if the requested device is already exclusively open; and returning a busy code to the computing system if the request is an exclusive open request and the requested device is already open.

12. The method of claim 11 and in addition the steps of:

granting the exclusive open request and setting the exclusive flag in the requested device characteristic list if the requested device is not already open; and setting the open count to non-zero in the requested device characteristic list if the open volume request or the open device request is granted whereby the access to a storage device may be requested either as a volume request or a device request and conflicts between the requests are managed.

13. A computer program storage medium readable by a computing system and encoding a program of instruction for executing a computer process in response to an open volume request or an open device request by a user of the computing system including an open volume operative system and open device operative system which are operated in parallel, said computer process comprising the steps of:

instructing said computing system to store characteristic list for an information storage device, the characteristic list including a first characteristic indicating whether or not the storage device is currently open for access and a second characteristic indicating whether or not the storage device is currently open for exclusive access;

instructing an open volume operative system, in response to said open volume request, to test the first characteristic to determine whether the requested device is already open, to test the second characteristic to determine whether the requested device is already exclusively open, to detect whether said open volume request is an exclusive open volume request, to grant said open volume request and setting said first characteristic to open if the request is not an exclusive open request, otherwise return a busy code to the computing system;

instructing an open device operative system, in response to said open device request, to test the first characteristic to determine whether the requested device is already open, to test the second characteristic to determine whether the requested device is already exclusively open, to detect whether said open device request is an exclusive open device request;

to grant said open device request and setting said first characteristic to open if the request is not an exclusive open request, otherwise return a busy code to the computing system.

14. The stored computer process of claim 13 further comprising the steps of:

returning to the computing system a busy code if the storage device is already exclusively open; and returning a busy code to the computing system if the request is an exclusive open request and the first characteristic indicates the storage device is already open.

15. The stored computer process of claim 14 further comprising the steps of:

granting the exclusive open request and setting the second characteristic to indicate exclusive open if the storage device is not already open and setting the first characteristic to indicate the storage device is now open whereby the access to a storage device may be requested by a plurality of requests and conflicts between the requests are managed.

16. The stored computer process of claim 13 further comprising the steps of:

granting the exclusive open request and setting the second characteristic to indicate exclusive open if the storage device is not already open and setting the first characteristic to indicate the storage device is now open whereby the access to a storage device may be requested by a plurality of requests and conflicts between the requests are managed.

* * * * *